United States Patent Office 3,037,842
Patented June 5, 1962

3,037,842
AMMONIUM BROMIDE COMPOSITION
Elmer L. McMaster and Floyd B. Nagle, Midland, Mich., assignors to The Dow Chemical Company, Midland, Mich., a corporation of Delaware
No Drawing. Filed Feb. 17, 1960, Ser. No. 9,181
4 Claims. (Cl. 23—100)

This invention relates to ammonium bromide, and more particularly, to a corrosion inhibited ammonium bromide product and its method of preparation.

Ammonium bromide is corrosive to metals. This corrosiveness greatly limits the utility of the material. The material is hydroscopic and also sublimes at room temperature so that a metal in contact with the solid ammonium bromide or an atmosphere exposed to ammonium bromide will corrode extensively. Ammonium bromide has desirable properties in that when it is dispersed in plastic material it imparts fire resistant properties to the plastic. However, due to the corrosiveness of the material it is finding limited use for this purpose. It is difficult to store and also corrodes the equipment used in molding or extruding the plastic material containing the ammonium bromide.

In addition to its corrosiveness ammonium bromide has another undesirable property which further limits its use as a fireproofing agent in plastics. Due to the hydroscopic properties of the ammonium bromide and its sublimation, ammonium bromide upon storage tends to cake or agglomerate and is difficult to disperse. To disperse the ammonium bromide evenly in a plastic material, it is essential that the particles of the ammonium bromide be of a small size, preferably less than 40 microns. When larger particles are used or when the ammonium bromide is not adequately dispersed, formation of specks or rough spots on the surface of the fabricated plastic article is obtained. This adversely affects the appearance and sealability of the items. Thus, it is desirable to have an ammonium bromide product which is inhibited to decrease its corrosiveness and also a method for the preparation of this product in a fine particle size.

It is the principal object of this invention to provide an inhibited composition of ammonium bromide to inhibit its corrosion of metals. A further object is to provide a free-flowing ammonium bromide product in small particles size which will not cake or stick together upon storage. A still further object is to provide a method for the preparation of the inhibited ammonium product which is free-flowing and of small particle size.

The above and other objects are attained according to the invention by intimately intermixing from 0.5 to 15 weight percent, based upon ammonium bromide, of a compound selected from the group consisting of N-beta-cocoaminobutyric acid, o- and p-vinylbenzyl sulfonate, and the diethylamine salts of a mixture of the mono- and di-octylphenyl esters of phosphoric acid. When the above compounds are intermixed with ammonium bromide the corrosiveness of the ammonium bromide is inhibited. The solid particles of ammonium bromide in contact with the metal will not corrode the metal nor will an aqueous solution of the product be corrosive to the metal.

The various known methods for intimately intermixing two materials may be used in the formation of the inhibited ammonium bromide product. Generally, the most convenient methods of intermixing the additaments with the solid ammonium bromide is to add the additament to the ammonium bromide and then grind the mixture to obtain uniform distribution of the additament throughout the ammonium bromide. Spray drying of ammonium bromide solutions or emulsions containing the additament may be also used as a method to obtain the inhibited product.

Spray drying of ammonium bromide solutions or emulsions to which the additaments have been added has a further advantage in that a fine, free-flowing product of ammonium bromide is obtained. The particles obtained are in the range of a micron size and do not cake or adhere together. Thus spray drying provides a convenient method of not only dispersing the inhibitor into the ammonium bromide, but the inhibitor serves an additional function of producing a fine free-flowing product. Spray drying of ammonium bromide solutions to obtain fine particles of the ammonium bromide without the addition of the additaments is not satisfactory. The particles obtained by spray drying cake or adhere together as soon as they are formed. Thus large particles are obtained or the particles adhere together making it difficult to disperse them in plastic materials without the formation of specks or rough spots on the surface of the material.

The amount of the additaments intermixed with the ammonium bromide may be widely varied. An amount of from 0.5 to 15 weight percent is generally sufficient to inhibit the corrosiveness of the ammonium bromide. The same amount is also sufficient to impart the free-flowing non-caking characteristics to the particles when the ammonium bromide product is obtained by spray drying. It is preferred to use from 1 to 3 weight percent of the additament.

In preparing the stabilized ammonium bromide product by spray drying, an aqueous ammonium bromide solution to which the additament has been added is used. With additaments, such as o- and p-vinylbenzyl sulfonate which is soluble in aqueous solutions, the additament is added to the solution and dissolved therein. For additaments, such as N-beta-cocoaminobutyric acid and the diethylamine salts of the octylphenyl esters of phosphoric acid, an emulsion with the ammonium bromide solution is prepared and then spray dried.. In the preparation of these emulsions, it may be desirable to use a surfactant or emulsifier, such as the polyalkylene sorbitan esters of long chained acids as polyethylene sorbitan monolaurate, polyethylene sorbitan tristerate, polyoxyethylene sorbitan pentaoleate or other well known emulsifiers. With the addition of an emulsifier, stable emulsions may be obtained and thus easily spray dried. It is not necessary to use the emulsifiers but then it may be necessary to continually agitate the mixture to maintain the additaments properly dispersed as it is fed into the spray nozzle. The various known spray drying equipment may be used.

The following examples further illustrate the invention.

*Example I*

An aqueous solution was prepared which contained 20.4 weight percent ammonium bromide, 2 weight percent of a mixture of o- and p-vinylbenzyl sulfonate and the remainder water. The solution was spray dried in a spray drying unit at a rate of 1 gallon per hour. The spray drier was operated at an inlet temperature of 350° C. and an outlet temperature of 105° to 115° C. The product obtained, containing 90.3 percent ammonium bromide, was white in color and free-flowing. It had an average particle size of approximately 1 micron. When stored in a sealed bottle for approximately 1 year the ammonium bromide remained white in color and free-flowing.

To show the effect of the vinylbenzyl sulfonate as a corrosion inhibitor, a mild steel coupon, approximately ½ inch wide and 1 inch long of ⅛ inch thick stock, was placed in a petrie dish and covered with the ammonium product containing approximately 10 percent of the vinylbenzyl sulfonate. The petrie dish was suspended over water in a closed desiccator and maintained at room temperature. The mild steel coupon was weighed prior to exposure to the ammonium bromide product and cleaned and reweighed after the exposure to determine the loss of metal obtained. With the product containing the vinylbenzyl sulfonate a loss of .0012 gram per day was obtained. When a mild steel coupon of substantially the same dimensions as above was exposed, in a similar manner to that above, to ammonium bromide containing no additament, a corrosion loss of weight of .054 gram per day was obtained.

*Example II*

An emulsion containing approximately 20 weight percent of ammonium bromide, 2.2 percent of N-beta-cocoaminobutyric acid, 0.4 weight percent of a polyethylene sorbitan monolaurate as an emulsifier, and the balance water was spray dried. The emulsion was made by adding the emulsifying agent to the cocoaminobutyric acid and then intermixing it with an aqueous ammonium bromide solution. The spray dried product contained 92.5 weight percent of ammonium bromide, was white in color, and was free-flowing.

A corrosion test similar to that described under Example I was made where a similar sized mild steel coupon was exposed to the ammonium bromide containing the N-beta-cocoaminobutyric acid for 5 days. The metal remained lustrous and no corrosion was observed. A total loss of weight however in the five days was approximately .0024 gram. In a comparative test where the mild coupon was exposed to an uninhibited ammonium bromide the ammonium bromide was rusty in color and the metal coupon had a heavy coat of black material on the metal which was difficult to remove. In the five day exposure time, a total loss of 0.27 gram was obtained.

A mixture of ammonium bromide and N-beta-cocoaminobutyric acid was prepared by intermixing the N-beta-cocoamino-butyric acid with the ammonium bromide and hammer milling the mixture to obtain intimate mixing. The amount of the N-beta-cocoaminobutyric acid added was approximately 10 weight percent. The product thus obtained was tested for its corrosion of a steel coupon in a manner described above. After an exposure of 3 days, the metal remained lustrous and no corrosion was observed.

Another corrosion test was performed where aqueous solutions of ammonium bromide were used. In a comparative test, a mild steel coupon of substantially the same dimensions as the coupon of Example I was inserted in a 30 weight percent aqueous solution of ammonium bromide, while another similar coupon was placed in an ammonium bromide aqueous solution containing 36 weight percent of ammonium bromide to which approximately 4 weight percent of N-beta-cocoaminobutyric acid was added. A small amount of a polyethylene sorbitan monolaurate was also added in the second mixture to maintain the additament dispersed in the solution. At the end of 4 days the steel coupons were removed from the respective solutions. The aqueous solution containing no additive was rusty in color and the metal surface was dull and gray and a loss of 0.0260 gram was obtained. The metal coupon which was in the solution containing the N-beta-cocoaminobutyric acid was lustrous and the mixture itself was not discolored. A loss of 0.0009 gram was obtained.

*Example III*

In a manner similar to that described in Example II, an emulsion was made by adding 2 grams of a diethylamine salt of the octylphenyl esters of phosphoric acid to 90 grams of a 20 weight percent ammonium bromide solution. A small amount of a polyethylene sorbitan monolaurate as a dispersant was also added. A mild steel coupon of ½" x 1" x ⅛" was inserted in the emulsion. After 7 days the emulsion remained white and no discoloration of the solution was obtained. The steel coupon was slightly dulled. A loss weight of about only 0.001 gram was obtained in the 7 days.

A second run similar to the above was repeated except that only 0.37 gram of the additament was added to the 90 grams of 20 weight percent ammonium bromide solution. After 3 days the coupon was lustrous and the solution or emulsion remained white and uncolored. A loss of 0.005 gram was obtained.

A blank run was made where a similar mild steel coupon was placed in the 20 weight percent solution. A loss of 0.04 gram was obtained and the solution turned from white to an orange color in the three day test.

What is claimed is:

1. A composition of matter which comprises ammonium bromide intimately intermixed with from 0.5 to 15 weight percent of N-beta-cocoaminobutyric acid.

2. A composition of matter according to claim 1 where N-beta-cocoaminobutyric acid is intimately intermixed with the ammonium bromide in an amount of from 1 to 3 weight percent.

3. In a process for the spray drying of ammonium bromide aqueous solutions, the step to produce a free-flowing product of the ammonium bromide, which comprises intermixing with the ammonium bromide aqueous solution from 0.5 to 15 weight percent, based upon the ammonium bromide, of N-beta-cocoaminobutyric acid.

4. A process according to claim 3 wherein N-beta-cocoaminobutyric acid is intermixed with the ammonium bromide aqueous solution prior to spray drying in amount of from 1 to 3 weight percent, based upon the ammonium bromide.

References Cited in the file of this patent

UNITED STATES PATENTS

| | | |
|---|---|---|
| 2,238,651 | Keenen | Apr. 15, 1941 |
| 2,403,765 | Smith et al. | July 9, 1946 |
| 2,586,709 | Phillips | Feb. 19, 1952 |
| 2,616,786 | Whetstone | Nov. 4, 1952 |
| 2,797,982 | McKinney | July 2, 1957 |
| 2,802,784 | Nowak | Aug. 13, 1957 |
| 2,851,345 | Marsh et al. | Sept. 9, 1958 |
| 2,905,532 | Thompson | Sept. 22, 1959 |
| 2,940,935 | Reich et al. | June 14, 1960 |
| 2,944,936 | Bronson | July 12, 1960 |